July 6, 1965  R. H. MARTIN  3,192,638
FEATHER POSITIONING GAUGE FOR FLETCHING JIGS
Filed Dec. 3, 1962  4 Sheets-Sheet 1
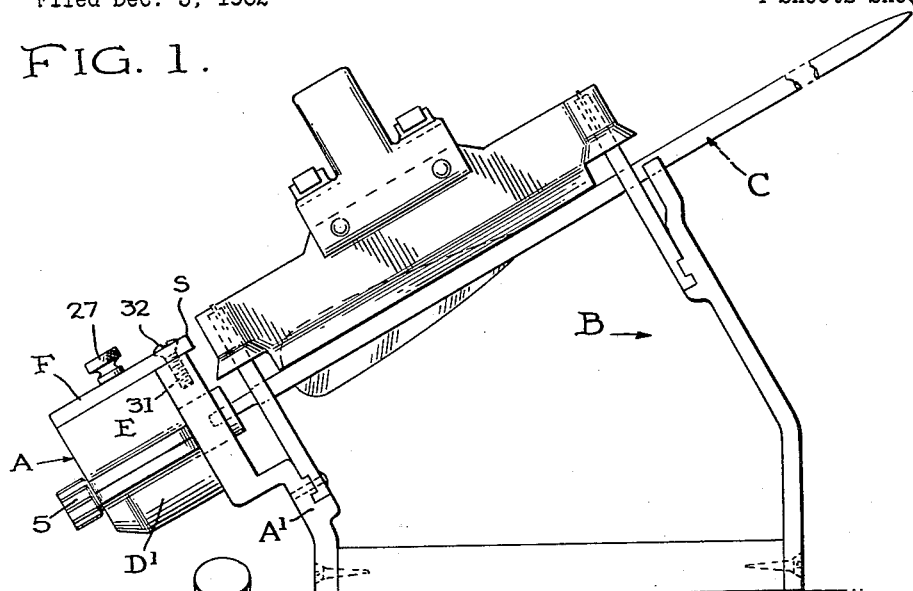
FIG. 1.
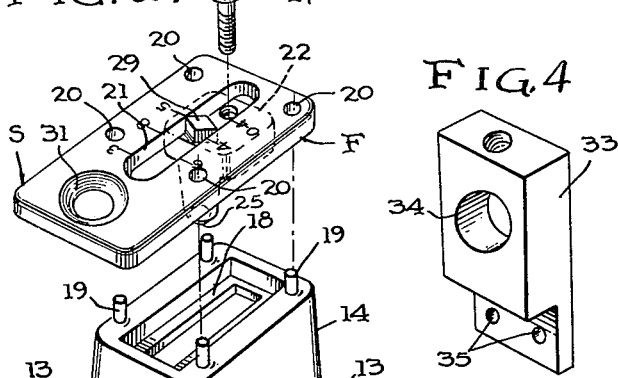
FIG. 2.
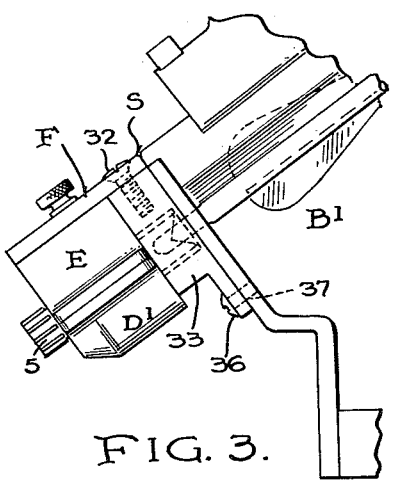
FIG. 4
FIG. 3.
FIG. 5.
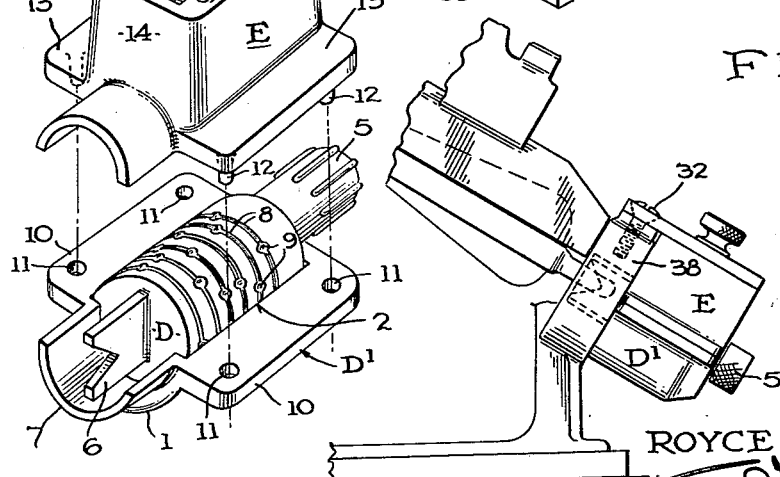
INVENTOR
ROYCE H. MARTIN
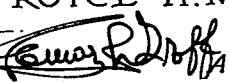
BY
ATTORNEY July 6, 1965  R. H. MARTIN  3,192,638
FEATHER POSITIONING GAUGE FOR FLETCHING JIGS
Filed Dec. 3, 1962  4 Sheets-Sheet 2
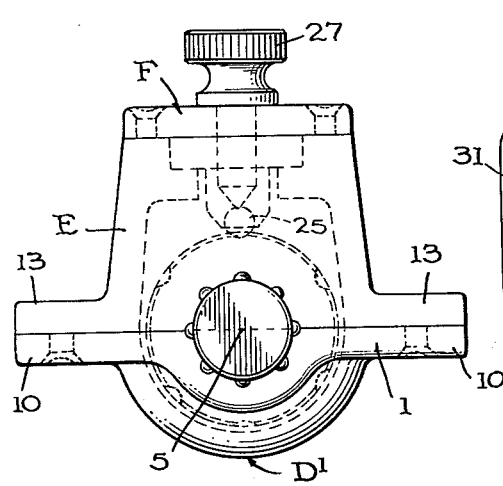
FIG. 6.
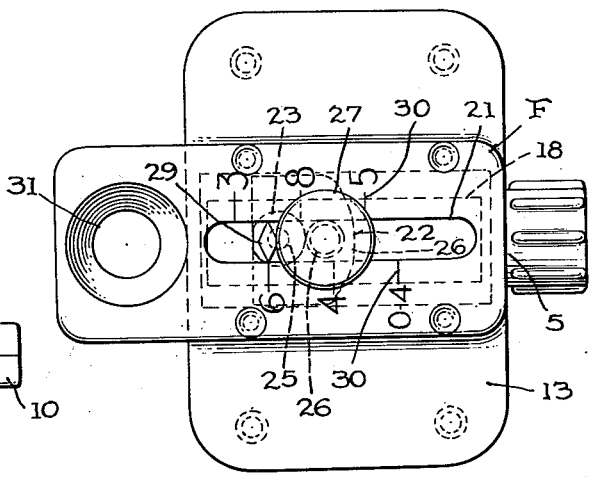
FIG. 7.
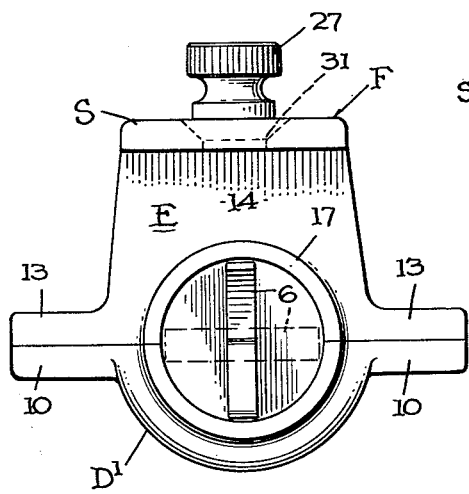
FIG. 8
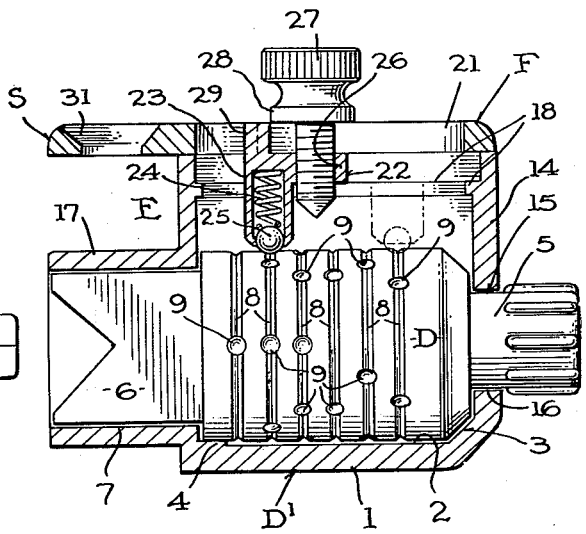
FIG. 9.
INVENTOR
ROYCE H. MARTIN
ATTORNEY July 6, 1965 R. H. MARTIN 3,192,638
FEATHER POSITIONING GAUGE FOR FLETCHING JIGS
Filed Dec. 3, 1962 4 Sheets-Sheet 3
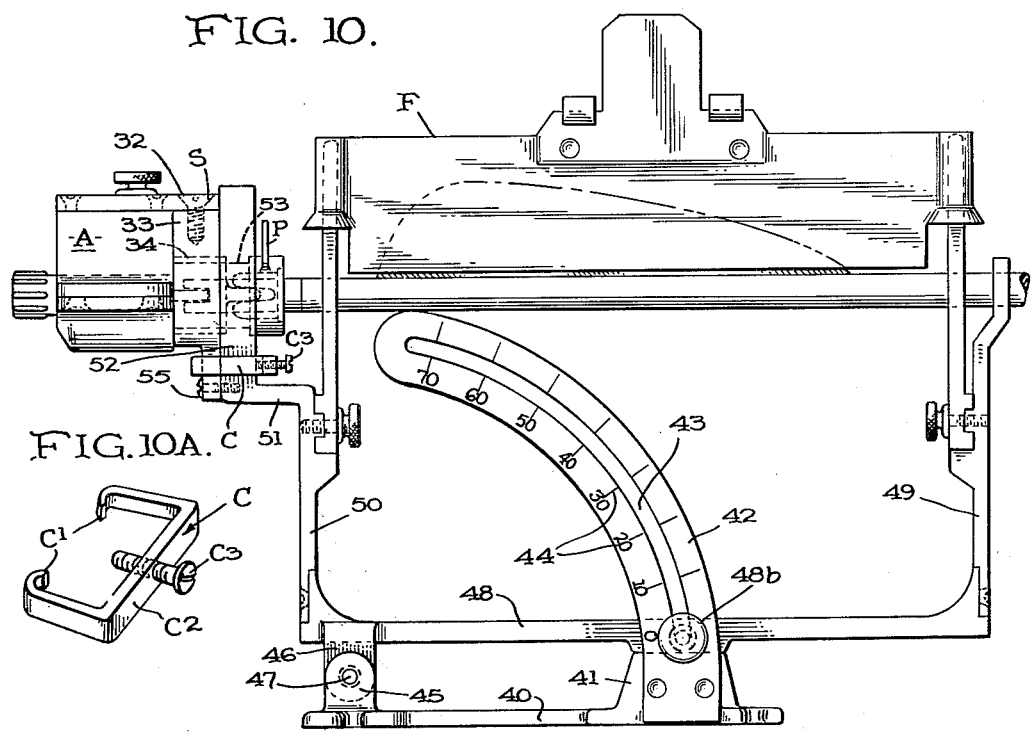
FIG. 10.
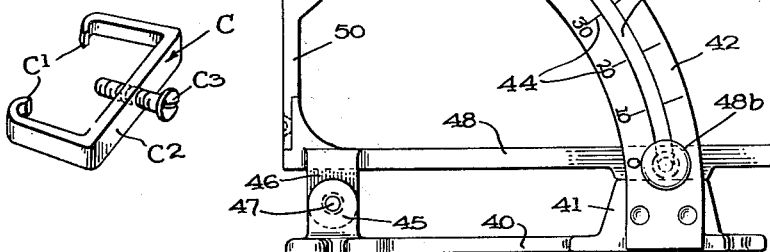
FIG. 10A.
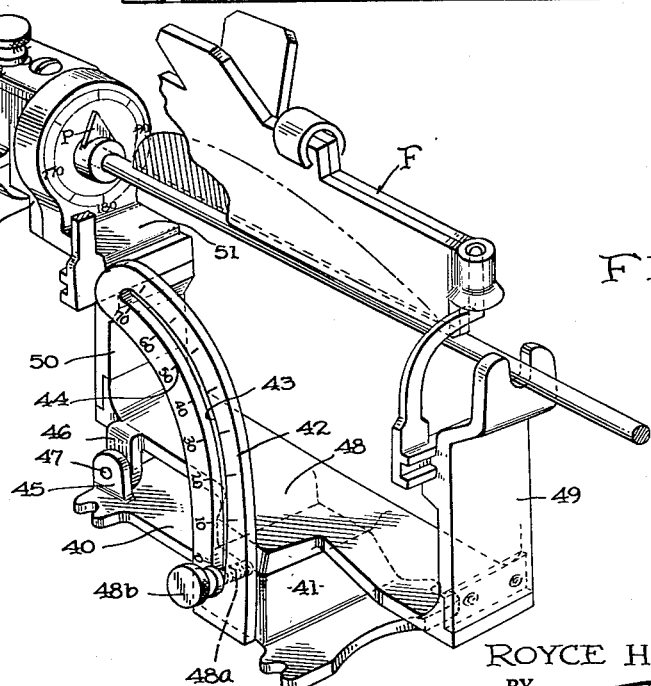
FIG. 11.
INVENTOR.
ROYCE H. MARTIN
BY
ATTORNEY July 6, 1965
R. H. MARTIN
3,192,638
FEATHER POSITIONING GAUGE FOR FLETCHING JIGS
Filed Dec. 3, 1962
4 Sheets-Sheet 4
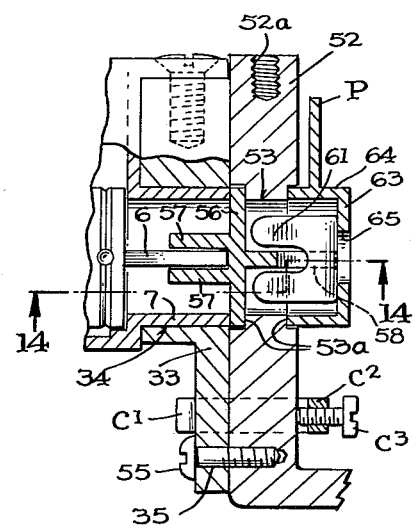
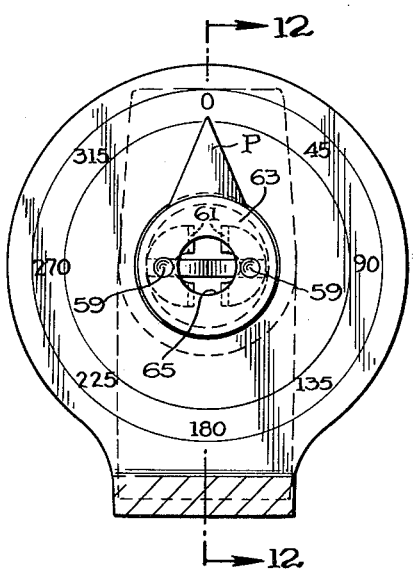
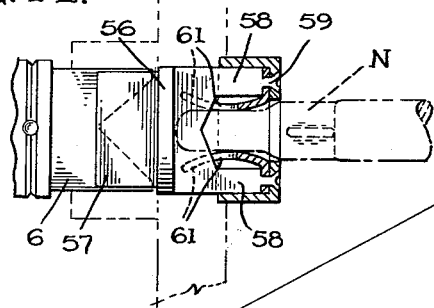
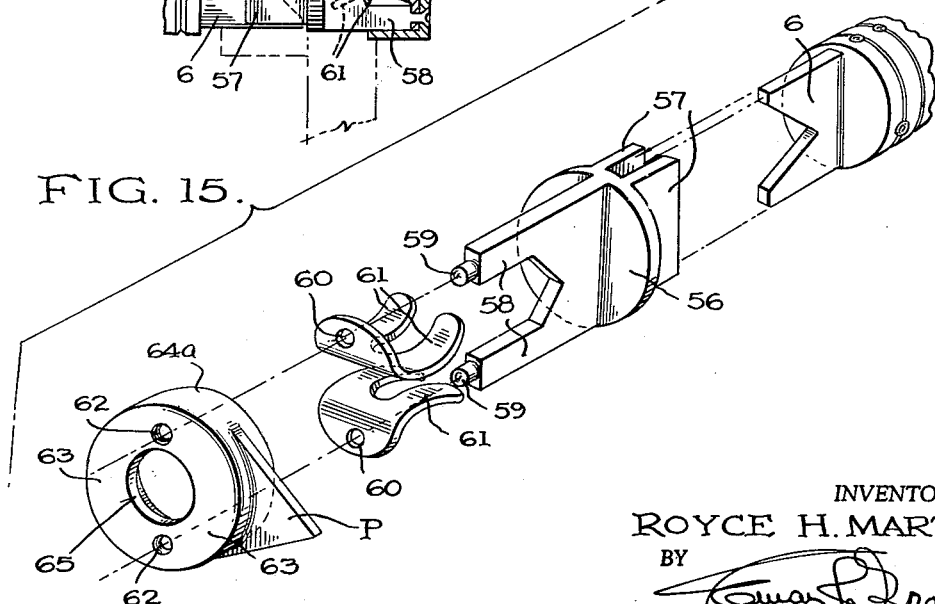
INVENTOR.
ROYCE H. MARTIN
BY
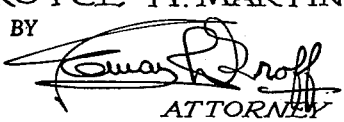
ATTORNEY United States Patent Office 3,192,638
Patented July 6, 1965

3,192,638
FEATHER POSITIONING GAUGE FOR FLETCHING JIGS
Royce H. Martin, 115 S. Williams St., Kennewick, Wash.
Filed Dec. 3, 1962, Ser. No. 241,829
4 Claims. (Cl. 33—180)

This invention relates to a feather positioning gauge for arrow fletching jigs.

One of the objects is to provide a gauge wherein a readily viewable upwardly exposed scale bearing member having a selector slide movable in a slot or window, parallel to the longitudinal axis of the arrow, overlies a manually rotatable indexing cylinder disposed coaxially with said arrow axis. This cylinder has a plurality of angularly disposed detent positions spaced at intervals along the surface of the cylinder in the direction of its axis. That is to say, the structure provides a gauge wherein visual inspection by the user is greatly improved, while at the same time, the axis of the cylinder aligned with the axis of the arrow and a manually manipulatable handle.

Another object is to provide a gauge whose structure lends itself to original manufacture, or to be embodied as an attachment for jigs of the type shown in my former patents, No. 2,897,860, Aug. 4, 1959; and No. 3,015,483, January 2, 1962, as well as other jigs on the market, in a simple and expeditious manner.

A further object of the invention is to provide a feather positioning gauge which is economical to produce and simple and reliable in operation. For example, the present invention eliminates as many as twelve parts heretofore required in a feather indexing gauge, namely, six indexers, one indexer-holding washer, two screws, one ball, one spring, and one set screw. Also, by simply loosening the indexer positioning screw cooperating with the slot or window, the screw may be readily moved to the desired position relative to the surface of the cylinder and reset. Furthermore, the present invention makes possible the repositioning of fifty indexers in less than two and one-half minutes and eliminates the need of tying up a large number of jigs with a specific indexer. Moreover, when used as an attachment, the present device makes it possible to convert an old jig to a modern device.

With the above and other objects in view which will appear as the nature of the invention is better understood, the invention consists in the novel construction, combination, and arrangement of parts, hereinafter more fully described, illustrated and claimed.

A preferred and practical embodiment of the invention is shown in the accompanying drawings, in which:

FIGURE 1 is a perspective view of a fletching jig generally of the type shown in my former patents and including the present construction.

FIGURE 2 is an exploded view showing its various parts of the invention in perspective.

FIGURE 3 is a detail side elevation of the present device applied to a jig by a complementary support or adaptor block.

FIGURE 4 is a perspective view of the adaptor block shown in FIGURE 3.

FIGURE 5 is a detail side elevation showing a further modified form of adaptor or support.

FIGURE 6 is an end elevation of the assembled unit looking at the end having the manually manipulated handle.

FIGURE 7 is a top plan view of the construction shown in FIGURE 6.

FIGURE 8 is an end elevation of the unit opposite shown in FIGURE 6 and illustrating the nock receiving socket.

FIGURE 9 is a longitudinal vertical sectional view taken on the vertical longitudinal center line of FIGURE 7.

FIGURE 10 is a side elevation of a jig illustrating an arrow supporting frame adjustable relative to the base and including the improved arrow positioning means.

FIGURE 11 is a perspective view of the jig shown in FIGURE 10.

FIGURE 12 is an enlarged sectional view taken on line 12—12 of FIGURE 13 showing the arrangement for adapting the arrow positioning means to the jig of FIGURE 10.

FIGURE 13 is a detail end elevation of the parts shown in FIGURE 12.

FIGURE 14 is a section taken on line 14—14 of FIGURE 12.

FIGURE 15 is a detail exploded perspective view.

Similar reference characters designate corresponding parts throughout the several figures of the drawings.

Referring to FIGURE 1, the arrow positioning device designated generally as A, is applied to a suitable portion A', for example, of a fletching jig designated generally as B. The device A is positioned on that portion of the jig which receives the nock end of the arrow C.

Considering more particularly the structural features of the device, preferably made by die casting, it will be seen from FIGS. 2–9 that the same essentially includes a casing or housing for an indexing cylinder D. This housing includes a cylinder cradling bottom member D', a complementary superimposed body section E capped by a cover F.

Referring first to the cradling member D', it will be seen from FIGS. 2 and 9 in particular that it includes a bottom wall 1 whose interior is provided with an arcuate cradle portion 2 to rotatably receive the cylinder D. The recess 2 is formed to permit free rotation of the cylinder D. For example, one end of the drum may be bevelled at 3, while the opposite end is provided with a shoulder 4. The bevelled portion 3 and the shoulder 4 serve as bearings for the cylinder so that the periphery thereof is not in contact with the cradling member D, thereby enabling it to be freely turned within the cradle portion 2. In other words, parts 3 and 4 serve to journal the cylinder for free angular movement about its axis.

One end of the cylinder is provided with an operator's handle 5, while the opposite end is provided with a fish tail type key 6 mounted in a sleeve portion 7 which receives the nock end of the arrow. The nock end of the arrow may be fitted over the fish tail portion 6 to firmly and securely connect the arrow shaft with the cylinder, rotatable handle 5, and key 6.

The surface or periphery of the cylinder D is provided with a series of spaced annular grooves 8. At appropriate angular intervals, these grooves are provided with detent recesses 9. In each of the grooves 8, the recesses 9 have different spacing to correspond with the selected angular position into which the arrow shaft is to be turned for a particular fletching operation as determined by a degree identifying numeral of a scale on the cover F. For example, the degrees are as follows: the detents are 3 at 120° intervals; 6 at 60°; 8 at 45°; 4 at 90°; 5 at 72°; while the 4–0 (four odd) are 75° and 105° apart.

The cradle member D' is provided with laterally extending flange portions 10 preferably provided with openings 11 to receive the downwardly projecting pins 12 on the underside of the flanges 13 of the body section E. The outer wall 14 of the hollow body section is provided with an arcuate bearing portion 15 (FIG. 9) which surrounds the shank of the operator's handle 5 when it is cradled in the bearing surface 16 of the bottom section D'.

The front end of the body E is provided with an arcuate sleeve portion 17, complementary to portion 7 of the bottom section D, thereby to completely house the key 6. The upper portion of the body E is formed with a recessed guideway 18. In addition, the upper edge portion of body section E is provided with pins 19 intended to cooperate with the opening 20 in the cover F to close the body E except for the guideway 18, which registers with a similar slot 21 in the cover F.

The guideway 18 is intended to slidably receive a scale selector member 22.

The said scale selector is preferably in the form of a block 22, and as shown in FIGS. 2 and 9 has its opposite edges overlying the guideway 18 and is provided with a barrel portion 23 which provides a socket for receiving spring 24 tending to urge ball 25 toward the drum D. In addition, the scale selector is provided above the guideway with an internally threaded arm which receives the threaded shank of a set screw 27. The flange 28 of this screw overlies the edges of the slot 21 so that when the set screw is tightened, the barrel 23 will be held in a selected position determined by a diamond shaped pointer 29 cooperating with a degree scale 30 on the exposed face of the cover F.

The foregoing description is directed to the essential structural features of the device whether it is used as original construction or an attachment. When used as an attachment it may be connected to any type of jig by suitable supports S.

In FIGS. 1, 2, 3 and 6–9, this support is in the form of an extension of the cover or cap F and is provided with an opening 31 to receive a suitable threaded attaching screw 32 which passes through the opening 31 and into a related threaded socket on the frame of the jig.

FIGURES 3, 4, and 5 of the drawings illustrate variations in the means S for supporting and attaching the gauge to different types of jigs. For example, in FIGS. 3 and 4, the assembly is mounted on the jig B' by a block 33 having an opening 34 to receive the sleeve formed by the complementary portions 7 and 17, while the block itself may be provided with openings 35 to receive screws 36, which in turn are threaded into openings 37 on the frame of the jig. In this arrangement, the cover or cap F has the same type of support S shown in FIGS. 2 and 6–9 inclusive.

FIGURE 5 continues the construction of FIGURES 1, 2 and 6–9 with the use of a different form of block 38. This block 38 has an opening similar to 34, FIG. 4, and permits the screw 32 to enter the side wall of the block which is fixed to the frame of the jig.

From the foregoing figures, it will now appear that the fletching gauge, in all forms, includes the sections D', E and F for housing the cylinder D having handle 5, while the front end provides a socket for receiving the nock end of the arrow and engaging the key 6 on the drum D'.

The operator's handle 5 may be freely twisted or turned to respond to the selected scale settings. When the set screw 27 is loosened in arm 26, the degree selector may be freely moved longitudinally of the guideway 18 until the pointer 29 is set in accordance with the markings on the selector scale 30 on the cover F. The transverse marks on the scale are directly related to the grooves 8 on the cylinder D. As the user moves 27, and consequently 29, in the guideway 18, the ball 25 will yieldingly ride over the grooves 8 until the ball drops into the groove related to the selected scale mark. The set screw 27 is then tightened, the handle 15 turned until the ball engages one of the detent recesses 9 in the selected grooves. Thereafter, turning of the shaft or handle 5 will rotate the drum D so that as the drum stops at the location of each recess, it will indicate where a feather is to be attached.

Referring to FIGS. 10–15 inclusive, it will be seen that the gauge may be applied to jigs of the type shown in my aforesaid patents in which the nock supporting frame is adjustably mounted on a base.

For example, the jig includes a base 40 having an upstanding boss 41 to which an arcuate arm 42 is attached. This arm has a slot 43 with scale markings 44 thereon. The base 40 also has an upstanding ear 45 to which the down-turned ear 46 is connected by a pivot 47 to the horizontal frame part 48. The frame includes the upright arms 49 and 50 having the features shown in my former patents. The horizontal part 48 of the jig frame is provided with a threaded socket portion (not shown) to receive the threaded shank 48$^a$ of a set screw 48$^b$. It will thus be seen that the nock supporting frame 48, 49, 50 may be tilted on pivot 47 to a selected angular position relative to the base 40 and the set screw 48$^b$ tightened up to hold the frame in the desired angular position.

The arm 50 is provided with the horizontal portion 51 and an upright portion 52 having an opening 53.

This opening 53 has shoulders 53$^a$ on opposite sides thereof, for reasons that will hereinafter appear.

An adaptor block 33, such as shown in FIG. 4, and having an opening 34, may be attached to the arm 52 by a screw 55 passing through openings 35, or, alternatively, the reduced lower end portion of the block 33 may be embraced by a clamp C shown in FIG. 10$^a$ and including the inturned end portions C' and the transverse portion C$^2$ having screw C$^3$.

As shown, one of the shoulders 53$^a$ constitutes an abutment for a coupling disc 56 confined between the inner end of sleeve 7 and the related shoulder 53$^a$. This disc has, on one side, a pair of spaced flanges 57 intended to embrace and telescope over the fish tail nock engaging member 6, while the other side of the disc is provided with spaced arms 58 having reduced rivet portions 59 for engaging the openings 60 in nock engaging and clamping springs 61. These rivet portions 59, after passing through holes 60, pass through registering holes 62 in the face 63 of a collar 64 having a side wall 64$^a$ whose edges abut against the realted shoulder 53$^a$. When the rivet portions 59 are bradded over the edges of the holes 62, the entire assembly is held together as shown in FIGS. 12 and 14. The face 63 of the collar 64 is provided with a central opening 65 which receives the nock end of the arrow. As shown in FIG. 14, for example, when the nock end N of the arrow shaft is pushed through the opening 65, the nock of the arrow will not only be centered, but will also be firmly gripped by the springs 61. Thus, when drum D is turned by handle 5, disc 56 causes all related parts to turn correspondingly.

From the foregoing, it will be understood that the arrow positioning assembly A can be applied to a jig of the type shown in FIG. 10 by the use of the adaptor means 33 and the additional elements of the adaptor assembly just described.

I claim:
1. A feather positioning gauge for fletching jigs, comprising, in combination,
   a housing having a slot with scale markings on each side and internal journal bearing portions,
   an indexing cylinder rotatably supported in said bearings and having its medial peripheral portion out of contact with the housing and accessible through said slot,
   a feather positioning selector member alternately slidable and fixed in said slot,
   and means on the said selector for cooperating with the periphery of the cylinder to hold the latter in a given selected position corresponding to the adjusted position of the selector member relative to said scale markings.
2. A feather positioning gauge for fletching jigs, according to claim 1, wherein,
   the housing includes a bottom cylinder cradling section,
   a hollow body section covering the cylinder above its axis, said sections having complemnetary connecting flanges, and the body section has an exposed depressed guideway, and the cover section has the slot for slidably receiving the selector member.

3. A feather positioning gauge for fletching jigs according to claim 2, wherein, the cylinder has an axial operator's handle projecting outside of the housing and the bottom cradling section and the body section has complementary sleeve forming portions to receive a nock engaging member on the cylinder.

4. In a feather positioning gauge for fletching jigs, the combination comprising, an arrow shaft support including an arm having an opening provided at opposite sides with shoulders, a feather positioning gauge device including a casing having a slot, a cylinder rotatably mounted in said casing, an operator's knob for said cylinder projecting from said casing, a nock engaging key on the end of the cylinder opposite the knob, a sleeve on the casing, an adaptor block having the opening and secured to said arm, said sleeve fitting in said opening and engaging one of said shoulders, and nock receiving means adapted for engagement with said key, said nock receiving means including a coupling including a disc having spaced flanges at one side thereof for embracing said key and having spaced arms on the other side thereof, said disc engaging one of the shoulders of the opening in the arm, a collar, springs fitted in said collar and interlocked therewith by the arms on the coupling, said coupling having its side wall in abutting engagement with the other shoulder of the opening.

References Cited by the Examiner

UNITED STATES PATENTS

| | | | |
|---|---|---|---|
| 276,346 | 4/83 | Brooks et al. | 74—816 X |
| 316,811 | 4/85 | Nodle | 74—816 |
| 2,286,574 | 6/42 | Rohde | 269—38 |
| 2,502,784 | 4/50 | Fahlander | 269—79 X |
| 2,564,566 | 8/51 | Duffy | 269—79 X |
| 2,869,597 | 1/59 | Lozon | 269—74 X |
| 3,015,483 | 1/62 | Martin | 269—38 |

ISAAC LISANN, *Primary Examiner.*